Patented Mar. 4, 1952

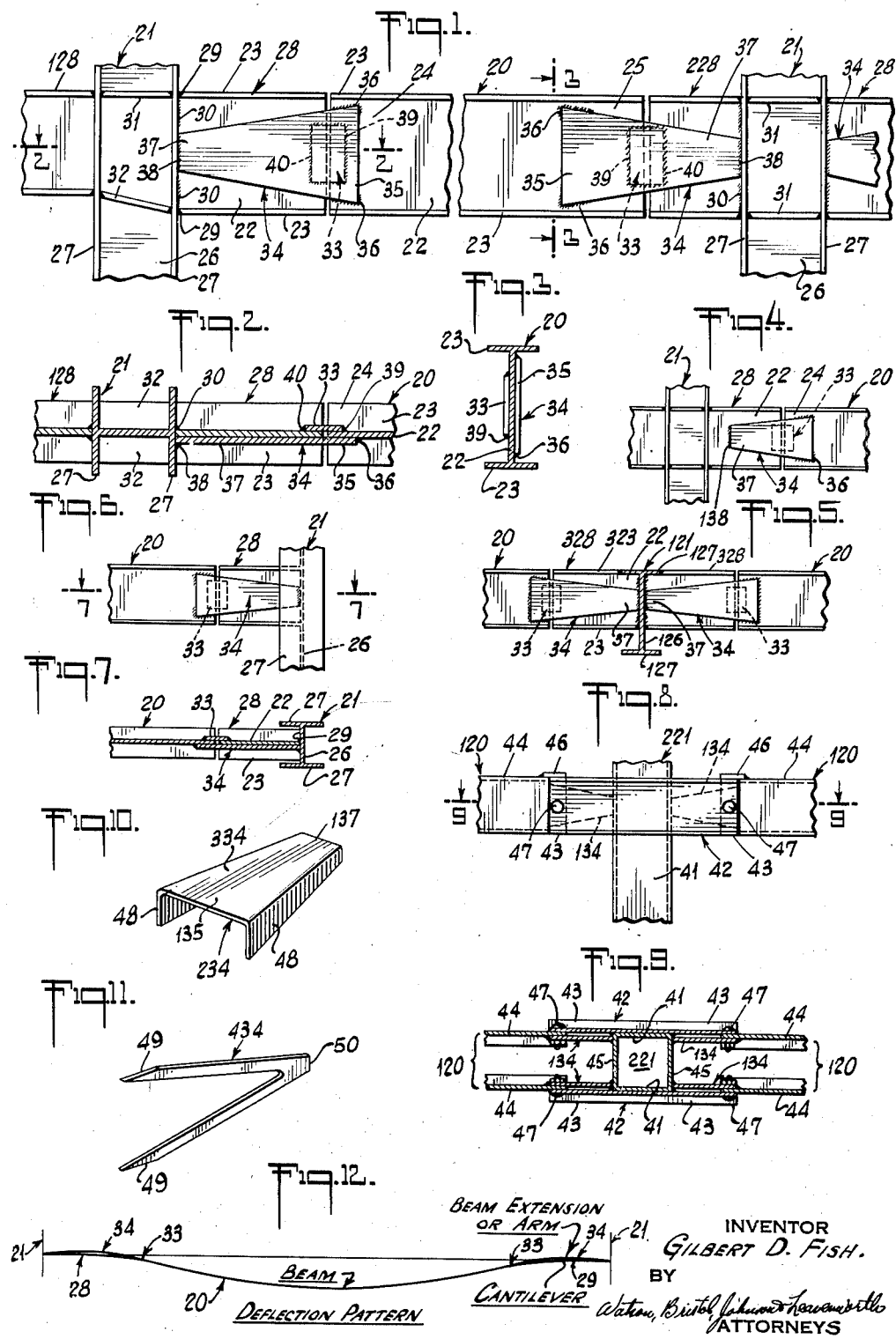

2,588,225

UNITED STATES PATENT OFFICE 2,588,225

STRUCTURAL BEAM END CONNECTION

Gilbert D. Fish, Pelham, N. Y.

Application August 19, 1948, Serial No. 45,001

8 Claims. (Cl. 189—36)

The present invention relates to structural beam end connections for various types of load-bearing beams such as I-beams, channels, plate girders, and other flexural members of steel or other metallic material in spans.

The general object of the present invention is to provide such beam end connections which are simply and readily formed and are of such constructions as to make possible balancing of any desired portion of the positive center moment by negative end moments with the negative moments desirably decreasing the positive moment in order to permit an unusual and desirable reduction in the amount of required structural materials, and which permits a desirable economy in labor since certain operations may be performed in the shop which are there more readily accomplished and which are less expensive than when necessarily performed in the field.

A more specific object of the invention is to provide such a beam end connection that is featured by hinge connection of a beam end portion to supporting means in association with an extension arm fixed to the beam end portion and extending past the hinge connection to restraining anchorage to the supporting means; thereby permitting production of a partially rigid frame with predetermined degree of rigidity to produce practically any desired ratio of maximum positive moment at or near the middle of a load-bearing beam to maximum negative moments at the extreme ends of the span regardless of the type of load it is designed to carry, even to approximate balance or equality thereof. This permits a large reduction in the structural materials required for particular loads.

Another object is to provide such a beam end hinge connection and restraining arm construction which effectively accomplishes desired economical distribution of bending moments without necessity of field connections to resist maximum moments, and which assures stability against tendency to collapse or excessive vibration that may result from horizontal forces set up by wind, earthquake, machinery vibration, and the like.

Still another object of the invention is to provide such connection with a restraining extension arm of a flexibility appreciably greater than that of the beam to which it is fixed so as to assure a predetermined amount of negative bending moment in the support means at the ends of the span and to make for further economy in materials used in erecting a structure.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a side elevational view, with parts broken away, of a span including a load-bearing beam supported at its two ends by columns with employment of connections of the present invention, the connection at the right being different from that shown at the left in that anchorage of the extension arm to the beam end portion is located at a much greater distance from the hinge locality;

Fig. 2 is a section taken substantially on line 2—2 of Fig. 1, and with parts broken away;

Fig. 3 is a section taken substantially on line 3—3 of Fig. 1;

Fig. 4 is a side elevational view, to smaller scale, of structure similar to that shown in Fig. 1, indicating a modification of the connection of the invention, more particularly with respect to anchorage of the extension arm to the supporting means;

Fig. 5 is a side elevational view, with parts in section and broken away, of a pair of opposed beam end connections employed for connecting ends of spans to another beam as the supporting means as distinguished from the column supporting means of Figs. 1 and 4;

Fig. 6 illustrates employment of the beam end connection of Figs. 1 and 5 in a structure wherein the supporting means is an H-beam column but oriented ninety degrees (90°) to the position of similar column means in Figs. 1 and 4, that view being a side elevation with parts broken away;

Fig. 7 is a sectional view taken substantially on lines 7—7 of Fig. 6;

Fig. 8 is a side elevational view, with parts broken away, of another embodiment of beam end connection of the present invention, with the column support comprising a hollow or box structure, with each beam structure comprising an opposed pair of channel members and with the connections modified for adaption to such structural elements;

Fig. 9 is a sectional view taken substantially on line 9—9 of Fig. 8;

Fig. 10 is a perspective view of a modified form of extension arm which may be employed in the connections of Figs. 1 to 9 inclusive.

Fig. 11 is a perspective view of a further modification of the extension arm which may be employed in such connections; and Fig. 12 is an exaggerated diagram illustrating the relative elastic deformation of uniformly loaded beam and connecting elements of the present invention.

Referring to the drawing, like numerals identify similar parts throughout, and it will be noted that, by way of example, there are shown therein various embodiments of the structural beam end connections of the present invention.

In Fig. 1 is shown, in elevation, parts of a structural steel beam and column construction, with a load-bearing beam 20 of the I-beam type being shown supported between a pair of columns 21, 21, also of the I-beam type, as is more clearly indicated in Figs. 2 and 3. The load-bearing beam 20 thus comprises a web 22 and flanges 23, 23, and it terminates in end portions 24 and 25. Each of the I-beam columns 21 consists of a web 26 and flanges 27, 27.

Preferably each of the columns 21 is constructed and prepared in the shop to minimize field connections, and there one such column, such as that shown on the left in Fig. 1, may be fitted with a pair of relatively short cantilever stub beams 28 and 128, with the former formed of the same I-beam stock as is beam 20, and the latter, if desired, formed of different stock, e. g. smaller stock as may be dictated by the length of the adjoining span and the manner of its loading. In accordance with common practice and as preferred, welding is employed such as at the junctions of the web 22 and flanges 23—23 of cantilever stub 28 with flange 27 of I-beam column 21, such as at 29 and 30 respectively. Diaphragm plates 31 and 32 may be welded in the positions on the columns 21, 21 shown if required to reinforce the column. Of course, it will be understood that although welding is preferred, other known types of fixing connections between the cantilever stub beam 28 and column 21 may be employed if desired. For example, bolting or riveting may be used, as will be readily apparent to one skilled in the art.

The beam end connection of the present invention shown at the left side of Fig. 1 includes the cantilever stub beam 28, a hinge connection or means 33, and a restraining extension arm structure 34. As a shop operation, the extension arm 34 may have one end 35 thereof fixedly mounted or welded to the end portion 24 of the beam 20, such as at 36, or, alternatively, its other end 37 welded to the support means comprising column 21 and cantilever stub beam 28, for example, column flange 27 at 38. Depending upon which of those junctions is welded in the shop, the other will be formed in the field. Further, the hinge plate 33 may be welded in the shop along edges thereof, such as at 39 to the web 22 of the beam 20, or, alternatively, at 40 to web 22 of cantilever stub beam 28, with the other mentioned welding thereof being formed in the field, and it will be noted that the end 35 of extension arm 34 is fixed to beam end portion 24 in the vicinity of the hinge connection provided by hinge plate 33.

The beam end connection at the right side of Fig. 1 is similar to that on the left side thereof, except that it proposes fixing the extension arm 34 to the beam end portion 25 at a position appreciably back from the hinge connection at hinge plate 33. This may be accomplished by employing a shorter cantilever stub beam 228 as therein suggested, or by using a longer restraining extension arm structure. In any event, the actions are similar, and the parts are suitably proportioned as to accomplish the ends desired with regard to distribution of forces and moments. The span of Fig. 1 includes load-bearing beam 20 and its end connections comprising cantilever stubs 28 and 228, hinge means 33, 33, and restraining arms 34, 34; i. e., the structure extending between support columns 21, 21.

In order to understand more readily the operation and functioning of the structure and beam end connection embodiments shown by way of example in Figs. 1, 2 and 3, that of the Fig. 1 construction will be here contrasted with known types of structures and parts thereof. The beam end connections of the present invention and the associated elements are so proportioned as to restrain the ends of each beam a predetermined amount and to cause the bending moments to reverse in direction between the beam center and each end thereof. Certain principles which accomplish desired ends are frequently incorporated in structural steel and other buildings, viaducts and bridges, such as making lines of beams or aligned spans continuous across the supports instead of providing simple end supports for each beam at the ends of its own span. In framed structures having columns as well as beams, the beams are in some cases rigidly connected to the columns so as to form rigid frames in which the beam ends are fully restrained against rotating with respect to the columns and with respect to the ends of any other beams which may occur in adjacent spans at the same level.

As contrasted therewith, beam end connections of the present invention and structures resulting from employment thereof constitute a unique and important advance in that they assure an unusual saving in materials and economy in work in the field. In effect, the construction shown in Fig. 1 constitutes a partially rigid frame in which the degree of rigidity can be predetermined to produce an approximate balance or any desirable amount of inequality between the maximum positive movement in the beam 20 and the maximum negative moments at the supporting columns. This will be apparent from a comparison of the actions of various types of spans supported in other manners with those incorporating features of the present invention as indicated in the exaggerated diagram of Fig. 12 wherein the relative elastic deformation of a uniformly loaded beam, such as 20, and its connecting and associated elements is illustrated. In any span or beam construction wherein the ends thereof are simply supported and the beam carries a uniformly distributed load throughout its length, the bending moment at each end is zero, and at the middle is equal to the total load times the span divided by eight, with no negative moment existing at any section. If the ends of such a beam are absolutely fixed, as by fastening to rigid abutments to eliminate rotation completely, each end bending moment is equal to the total load times the span divided by twelve and that end bending moment is negative. The center moment in that case is positive and is equal to the total load times the length divided by twenty-four. Although the fixed-end beam construction has a relatively small positive center moment, it has negative end moments two-thirds as large as the maximum total moment in a simple beam carrying the same uniform load.

In accordance with the present invention, the rather flexible arms 34, 34 and the hinges 33, 33 provide sufficient flexibility in the end connections to allow a small amount of rotation of the ends of beam 20 about the hinge points, so that the positive moment at the center of beam 20 is increased and the negative moments in the vicinity of the end portions thereof is decreased. The hinge connections provided by hinge plates 33, 33 being such as to resist vertical shear without preventing practically free rotation, there is thus provided at the end portions 24 and 25 of the beam 20 connections to the ends of the cantilever stub beams 28 and 228 in the nature of supports for the vertical reactions of the central beam 20, with the hinge plate connections at 33, 33 being hinges in the structural meaning of the term. But, of course, it will be understood that, if desired, actual hinge pins or bolts to act as such may be employed for the same purpose. Of course, greater flexibility in hinge connections or plates 33, 33 can be had by shortening their vertical dimensions while making certain required strength relative to vertical shear is assured. The terms "hinge connections" and "hinge means" are used herein in the sense that they are such means as will resist shearing force without preventing relatively free rotation of the beam end portions.

Each beam end connection of Fig. 1 additionally includes the all important restraining extension arm 34, which at one end is rigidly attached to an end portion of the central beam 20 and extends past the hinge at 33 an appreciable distance to a point of restraining anchorage to the support means, such as to the column 21. This restraining extension arm 34 is not connected directly to the cantilever stub beam 28 in the vicinity of the hinge connection and is therefore free to deform independently of the cantilever stub beam. The anchorage of one end of the restraining extension arm 34 to the support means is such as to prevent that end of the arm from moving up or down. This anchorage exerts downward reactions on that end of the arm to prevent it from kicking upward, and these downward forces produce negative bending moment at the other end of the arm where it is fixed to the end portion 24 of the central beam 20. These negative moments are, of course, transmitted to the central beam at its end portions, but the amounts thereof are much smaller than the moments at the ends of the cantilever stubs where the latter are welded to the columns.

In the embodiment shown in Figs. 1, 2 and 3, it is proposed to employ as restraining extension arms 34 elongated tapered plate-like structures, as indicated, so as to assure appreciably greater flexibility in that arm than in the central beam section 20. The arm 34 is preferably tapered to make it relatively highly flexible without making it too shallow for the needed strength. One good reason for such arm construction is in order to assure economy in the use of materials since a relatively heavy arm structure is not needed. Greater flexibility in the restraining arm assures less bending moment in the support means or column to which the end of the arm is anchored or welded. Further, if the extension arm is so constructed as to have a flexibility about equal to that of the central beam, there would result in effect a comparatively rigid structure with the ends of the arm respectively fixed to the central beam and connected to the support means or column, and, of course, it is not economical or practical to obtain the effect of rigid beam structure by more complicated construction.

It will be understood, of course, that although restraining extension arms are shown in Figs. 1, 2 and 3 as being formed as separate plate-like elements formed from plate material or cast stock and thereafter welded at its ends respectively to the central beam and the support means, it can, of course, be provided as an integral part of the beam end portion with the fixing of the restraining extension arm to the load-supporting beam resulting from that integration. This, of course, can be accomplished by cutting away the flanges 23, 23 and portions of the web 22 from the end portion 24 of the central beam 20.

By suitable selection of the lengths of the cantilever stub beams (which, of course, dictates the location of the hinge supports at 33, 33), and of the depth, taper and thickness of the restraining extension arms 34, 34, almost any combination of distributed and concentrated loads on the beam can be caused to produce equal positive and negative bending moments, and, of course, it will be understood that the obtainment of certain advantages resulting from employment of the present invention are not dependent upon precisely equalizing the positive and negative moments, and that they can be realized to a degree if such moments are thereby made comparable in amount instead of very different as in the case of truly rigid frame constructions. With such beam end connections of the present invention, it is, of course, possible to make the end moments and central moment equal, the value in the case of uniformly distributed load being total load times span divided by sixteen, which is, of course, one-half the maximum moment in a simple beam construction.

Generally speaking, reducing the bending moment in a span by fifty percent does not reduce the amount of steel in the member as much as fifty percent, since the weight of an efficiently proportioned I-beam or steel girder is roughly proportional to the two-thirds power of the maximum bending moment. However, if one systematically reduces by nearly fifty percent the maximum bending moments in the beams of any certain construction by employment of features of the present invention, a saving of about three-eighths of the required beam material may be effected. No system of rigid frame construction closely approaches this percentage of weight saving since welding the members rigidly to one another results in negative moments which greatly exceed the positive moments.

Further, beam end connections of the present invention accomplish this economical distribution of bending moments without requiring the maximum moments to be resisted by field connections. In structural metal or steel framing, it has been found excessively expensive and generally uneconomical to utilize rigid frame design as the means of saving material, since welded or riveted field connections designed to resist large bending moments require an excessive amount of expensive labor. The present invention permits making of all of the joints which have to transmit bending stress entirely in the shop where conditions are more adapted to production of efficient results and where labor is less expensive.

It will be noted from the structure shown in Figs. 1, 2 and 3 that the restraining extension arms 34, 34 are not connected directly to the cantilever stub arms 28 and 228 in the vicinity of the hinge connections at 33, 33 so that those arms will be free to deform independently of the cantilever stubs. It practice, one may frequently put one or more bolts through any particular restraining extension arm and the associated support means or cantilever stub solely for the purpose of bracing the arm against buckling sideways. However, in such cases care will be taken to avoid any tight connection which would interfere with the intended relative movements of the parts and the desired distribution of stresses indicated above.

Preferably the connection of the restraining extension arm to the load-bearing beam and the connection of the cantilever stub to its support means will, as a practical matter, be formed by welding, but, of course, if for certain reasons other means of attachment which will accomplish similar results are desired, they may be used within the scope of the invention. Field connections which consist of the so-called hinge means at the junctions of the main beam and the cantilever beams and the anchorage of the restraining extension arms may be made by welding or bolting. If field welding is to be used for the structure as a whole, it may be preferred from the standpoint of simplicity and economy to attach the ends of the arms to the support means also by welding, but, of course, similar results can be accomplished by means of a shop-welded lug on the support means and a shim inserted in the field to take up the clearance necessitated by workmanship tolerances. In heavy beam constructions, the beam-to-cantilever connections may preferably be welded in view of the possibility that bolted connections or bearing lugs for such constructions may be excessively bulky.

It has been discovered that the negative moments at the beam ends which decrease the positive moment at the center of a uniformly loaded beam are induced by vertical rather than horizontal reactions. When such a beam is connected to supporting columns by welded or riveted joints designed to produce end restraint; i. e. negative moments, the effect is accomplished by horizontal tension in the top flange attachment and horizontal compression in the bottom flange attachment. In a system embodying principles of the present invention, the reduction in positive moment at the middle of the beam is accomplished partly by the cantilever construction and partly by the restraining arms which act like pump handles with a downward vertical force at the outer end of each arm and an equal upward force combined with moment at the other end of the arm which is attached or fixed to the beam. These restraining arms thus provide equality or any desired approach to equality of the maximum positive bending moment in the suspended beam and the negative bending moments in the cantilevers at their attachments to the supporting columns. Further, those arms provide stability against collapse or excessive vibration due to horizontal forces such as may result from wind, earthquake and machinery vibration, since in a building, columns with cantilever stubs carrying suspended beams by hinge connections alone, without restraining arm constructions of the present invention, would depend on the rigidity of the columns and the security of the column anchorage foundation for stability against such horizontal forces.

As contrasted with ordinary cantilever systems, attention is directed to the fact that the hinge connections for the ends of the load-bearing beams characterizing the beam end connections of the present invention can be and are much nearer to the support means while accomplishing the desired equalization of positive and negative moments. This is because the anchored ends of the extension arms at the support means are held down by vertical reactions which induce in the suspended beam at each hinge connection a negative moment equal to the vertical reaction times the length of the arm. In the case of uniformly distributed load, an ordinary type of hinge cantilever system would require cantilever stub beams which extend at least about fifteen percent (15%) of the span from each support column in order to attain the desired equality of positive and negative moments. However, beam end connections of the present invention permit the employment of cantilever stub beams of a maximum length of about ten percent (10%) of the span. Excessively long cantilevers would have, among other disadvantages, the impractical requirement of making the columns with their shop-attached cross arms or cantilever stubs inconveniently wide and bulky for transportation and erection, and finished constructions employing the same would be relatively unstable and subject to horizontal forces of the type mentioned above; e. g., wind forces, etc.

As indicated in the beam end connection at the right side of Fig. 1, the restraining extension arm 34 may, within the scope of the present invention, be made appreciably longer than the cantilever stub beam 228 and be fixed or attached to the end portion 25 of the central load-bearing beam 20 appreciably farther from the support means or column than the hinge connection at 33. This provides greater flexibility in the restraining extension arm which, in some cases, may be desirable, particularly where beams that are exceptionally long in proportion to depth are employed and which require extra flexibility of the arms.

In other situations, it may be desirable to locate the anchorage end 37 of the restraining extension arm 34 an appreciable distance away from the supporting column 21, as proposed in Fig. 4. In such case, the end portion 24 of the central beam 20 may have welded thereto at 36 one end of restraining arm 34 and connected by hinge plate 33 to the free end of cantilever stub beam 28, with the other end 37 of the arm welded at 138 to the web 22 of the cantilever stub beam 28 an appreciable distance away from column 21, as therein shown.

Fig. 5 shows beam end connections similar to that shown at the left side of Fig. 1 but differing in the type of support means. As shown in Fig. 5, the support means 121 may be a horizontal I-beam or girder having flanges 127, 127 and web 126. Each of cantilever stub beams 328 has its top flange 323 foreshortened and aligned with and welded to top flange 127 of I-beam support 121. The web 22 of cantilever I-beam 328 and the bottom flange 23 are welded to the web 126 of horizontal support beam 121, as is the inner end 37 of restraining extension arm 34. In all other respects, the beam end connections of Fig.

5 are similar to that shown in the left side of Fig. 1.

In Figs. 6 and 7 is shown a beam end connection associated with an H-beam column oriented to a position different from that illustrated in Figs. 1 to 4 inclusive. It will be noted in Figs. 6 and 7 that the cantilever stub beam 28 has its inner end located between flanges 27, 27 of column 24 and welded to column web 26. In all other respects, the structure of Figs. 6 and 7 is similar to that of the beam end connection at the left side of Fig. 1.

In Figs. 8 and 9 are shown further structural modifications in which are incorporated beam end connections of the present invention which may be used to advantage in hollow structural systems for air-conditioned buildings. As shown in Figs. 8 and 9, support column 221 may be hollow box-like structure serving as an air duct as well as a structural support. To opposite sides 41, 41 are welded a pair of channel extensions 42, 42, each providing an opposed pair of cantilever stubs 43, 43. Each beam 120 comprises a pair of channel members 44, 44 (which, of course, may be I-beam members, if desired) supported by hinge connections from the outer ends of a pair of the cantilever stubs 43, 43. To the web of each load-bearing beam or channel 44 is welded restraining extension arm 134, in turn anchored to hollow column 221, such as by welding or other means to another side 45 of hollow column 221, as shown. The hange connections of the beam end connections shown in Figs. 8 and 9 are provided by a plurality of lugs 46—46, with one welded to the top flange of each of the channels 44 and extending laterally to bear or rest upon the top flange of each of the cantilever channels 42. Such hinge connections are supplemented by means loosely to hold the parts in their relative positions without affecting hinge rotation and such means may comprise bolts 47—47, each of which is loosely received through oversized holes through the lapped ends of one of the cantilever channels 42, a beam channel 44, and the restraining extension arm 134 associated therewith.

As indicated above, a restraining extension arm member may be a tapered elongated element or trapezoidal cut-out from a flat plate, preferably of high-tensile steel, such as proposed in Figs. 1 to 9 inclusive. However, for long spans in heavy loads it may be advisable or desirable to use tapered channel members for such restraining extension arms, such as that proposed in Fig. 10, made by bending or pressing a trapezoidal plate to the shape there shown. As a result, such tapered channel restraining arm 234 may comprise a tapered web 334 having a wide end 135 and a narrow end 137. The channel arm 234 also includes flanges 48, 48 which preferably taper from the wide end 135 to the narrow end 137 of trapezoidal web 334 as shown. Of course, it will be understood that although the tapered form shown is preferred, since that shape and the high stress permitted by the extra strength of material combine to produce a sharper elastic curvature in the arm than in the beam, such extension arm may, of course, take the form of a piece of ordinary channel structural member or be in the form of an elongated rectangular plate. In the latter cases, it is preferable to insure greater flexibility in such an arm than in a beam structure to which it is fixed for the reasons indicated above, and, of course, such an arm might, if desired, be formed from the structure of the end of the beam, such as by cutting away flanges from an end of an I-beam, leaving a more flexible piece of the web to serve as the anchorage extension arm. Other possible variations will readily occur to those skilled in the art who will realize that the anchorage extension arms and hinge means may, if desired, be in the form of forgings or castings and possibly of variable thickness rather than being formed from plate stock.

As shown in Fig. 11, such restraining extension arm may also take the form of a V-shaped member 434 which may be formed by cutting from a thick plate or by bending a bar to V-shape and adapted to act like the end panel of a truss, which for a given depth and strength is somewhat more flexible than a tapered plate or channel. The restraining extension arm 434, of course, is intended to be mounted with its two arms 49, 49 fixed or welded to the end of a load-supporting beam, and with its small end 50 adapted to be secured to the support means in a manner to prevent displacement but not necessarily to prevent rotation.

It will thus be seen that the objects set forth above among those made apparent from the preceding description are efficiently attained and, since certain changes may be made in the above construction and differing embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A structural beam end connection comprising, in combination, a support member, a load-bearing beam having an end portion located in the vicinity of said support member, a cantilever stub beam member fixedly mounted on and extending away from said support member toward said beam end portion, hinge means rotationally connecting said beam end portion to said cantilever member, a moment-transmitting extension arm of greater flexibility than said load-bearing beam fixed to said beam end portion and extending past said hinge means to an anchorage point appreciably beyond said hinge means, and means at that anchorage point connecting said arm to one of said members.

2. A structural beam end connection as defined in claim 1 characterized in that said hinge means is a flexible plate-like member having opposite edges respectively lapped against and secured to said beam end portion and said cantilever member.

3. A structural beam end connection as defined in claim 2 characterized in that said hinge member is welded to said beam end portion and said cantilever member.

4. A structural beam end connection as defined in claim 3 characterized in that said hinge member is arranged substantially parallel to the plane of major bending moments of said load-bearing beam.

5. A structural beam end connection as defined in claim 4 characterized in that said extension arm is a tapered member having its larger end fixed to said beam end portion and its smaller end connected to its anchoring member at the restraining point.

6. A structural beam end connection as defined in claim 5 characterized in that said extension arm member has a major web portion thereof arranged substantially parallel to the plane of major bending moments of said load-bearing beam.

7. A structural beam end connection as defined in claim 6 characterized in that said extension arm is a separate plate-like member having its larger end lapped against and welded to a vertical web of said load-bearing beam and its smaller end welded to said support member.

8. A structural beam end connection comprising, in combination, an elongated load-bearing beam having an end portion located at the connection locality, supporting means which is wide at the connection locality in the direction of the longitudinal dimension of said beam having a lateral outer side portion located in the vicinity of said beam end portion, hinge means rotationally connecting said beam end portion on a substantially horizontal axis substantially normal to the longitudinal dimension of said beam to said outer side portion of said supporting means, moment-transmitting extension arm means fixed to said beam end portion and extending substantially collinearly of and away from said beam end portion past said hinge means and said supporting means outer side portion to an anchorage point appreciably inward of said hinge means and inward of said supporting means outer side portion in the direction of the longitudinal dimension of said beam away from said beam end portion, and means at that anchorage point connecting said arm means to said supporting means, said hinge and moment-transmitting extension arm means with the connections thereof to said beam and supporting means constituting the sole means of connection of said beam end portion to said supporting means.

GILBERT D. FISH.

REFERENCES CITED

The following references are of record in the file of this patent:

UNITED STATES PATENTS

| Number | Name | Date |
|---|---|---|
| 1,883,376 | Hilpert et al. | Oct. 18, 1932 |
| 1,899,799 | Edwards | Feb. 28, 1933 |
| 2,019,684 | Leake | Nov. 5, 1935 |
| 2,039,602 | Luebbe | May 5, 1936 |
| 2,146,332 | Deming | Feb. 7, 1939 |
| 2,146,333 | Deming | Feb. 7, 1939 |
| 2,382,583 | Scheyer | Aug. 14, 1945 |
| 2,387,134 | Fox | Oct. 16, 1945 |